United States Patent
Nakayama

(10) Patent No.: US 11,754,988 B2
(45) Date of Patent: Sep. 12, 2023

(54) INFORMATION PROCESSING DEVICE, INFORMATION PROCESSING METHOD AND RECORDING MEDIUM

(71) Applicant: HONDA MOTOR CO., LTD., Tokyo (JP)

(72) Inventor: Haruki Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 17/565,091

(22) Filed: Dec. 29, 2021

(65) Prior Publication Data

US 2022/0236702 A1    Jul. 28, 2022

(30) Foreign Application Priority Data

Jan. 26, 2021   (JP) ................................ 2021-010164

(51) Int. Cl.
| | | |
|---|---|---|
| G05B 15/02 | (2006.01) | |
| G06F 3/14 | (2006.01) | |
| B60Q 9/00 | (2006.01) | |
| H04W 4/80 | (2018.01) | |

(52) U.S. Cl.
CPC ............... G05B 15/02 (2013.01); B60Q 9/00 (2013.01); G06F 3/14 (2013.01); H04W 4/80 (2018.02)

(58) Field of Classification Search
CPC .. G05B 15/02; G05B 2219/2642; B60Q 9/00; G06F 3/14; G06F 3/147; H04W 4/80; H04W 4/02; H04W 48/20; H04L 12/2816; H04L 12/2823; H04L 2012/2841
See application file for complete search history.

(56) References Cited

U.S. PATENT DOCUMENTS

| | | | |
|---|---|---|---|
| 11,226,393 B2* | 1/2022 | Carter | H01Q 5/25 |
| 11,604,440 B2* | 3/2023 | Nakagawa | G05B 9/03 |
| 11,604,783 B2* | 3/2023 | Bar-on | G06Q 10/10 |
| 11,604,891 B2* | 3/2023 | Neves Creto | G06F 3/14 |
| 11,605,036 B2* | 3/2023 | Serven | G06N 5/046 |
| 11,605,283 B1* | 3/2023 | Beveridge | G01W 1/10 |
| 11,605,972 B2* | 3/2023 | Stauffer | H02J 7/0044 |
| 11,606,222 B2* | 3/2023 | Jessen | G05D 1/0088 |
| 11,606,456 B1* | 3/2023 | Kumar Agrawal | H04M 1/72454 |
| 11,606,595 B1* | 3/2023 | Kirley | G10L 15/26 |

(Continued)

FOREIGN PATENT DOCUMENTS

| | | |
|---|---|---|
| JP | 2015-095721 | 5/2015 |
| JP | 2019-126096 | 7/2019 |

*Primary Examiner* — Ramesh B Patel
(74) *Attorney, Agent, or Firm* — Rankin, Hill & Clark LLP

(57) ABSTRACT

An information processing device includes: a user action recognition part configured to recognize an action of a user of a moving body; an operation state acquisition part configured to acquire an operation state of an electrical apparatus installed in a building; and an information presentation part configured to display the operation state of the electrical apparatus at a display part installed in the moving body, and in a case where a specific action with which it is estimated that the user is to start traveling of the moving body is detected by the user action recognition part, the operation state of the electrical apparatus is acquired by the operation state acquisition part and the acquired operation state is displayed at the display part by the information presentation part.

9 Claims, 8 Drawing Sheets

(56) References Cited

U.S. PATENT DOCUMENTS

| | | | |
|---|---|---|---|
| 11,606,680 B2* | 3/2023 | Estreemera | H04B 5/0031 |
| 11,606,695 B2* | 3/2023 | Ostrovsky | H04L 12/2816 |
| 2015/0268648 A1* | 9/2015 | Zhang | G05B 15/02 |
| | | | 700/90 |
| 2015/0349972 A1* | 12/2015 | Deivasigamani | H04L 12/2816 |
| | | | 700/275 |
| 2017/0083220 A1* | 3/2017 | Gao | G06F 3/04847 |
| 2020/0301377 A1* | 9/2020 | Ohmura | G10L 15/1815 |
| 2022/0237690 A1* | 7/2022 | Nakayama | G06Q 30/0645 |

* cited by examiner

INFORMATION PROCESSING DEVICE, INFORMATION PROCESSING METHOD AND RECORDING MEDIUM

INCORPORATION BY REFERENCE

The present application claims priority under 35 U.S.C. § 119 to Japanese Patent Application No. 2021-010164 filed on Jan. 26, 2020. The content of the application is incorporated herein by reference in its entirety.

BACKGROUND OF THE INVENTION

Field of the Invention

The present invention relates to an information processing device, an information processing method and a recording medium.

Description of the Related Art

Conventionally, a method for a user using a moving body such as a vehicle to remotely control an electrical apparatus such as a household electrical appliance has been proposed. For example, Japanese Patent Laid-Open No. 2015-095721 discloses a configuration of transmitting information from a navigation device of a vehicle driven by a user to a house side device provided in a house of the user and controlling a household electric appliance installed in the house by the house side device. In a system in Japanese Patent Laid-Open No. 2015-095721, when the user is driving the vehicle and heading home, a predicted arrival time is transmitted by the navigation device of the vehicle and the house side device executes control contents reserved beforehand according to the predicted arrival time. In addition, Japanese Patent Laid-Open No. 2019-126096 discloses a system of remotely controlling an air conditioner installed inside a building. In the system in Japanese Patent Laid-Open No. 2019-126096, when a vehicle is present in a control area surrounding the building where the air conditioner is installed, a computer installed in the vehicle outputs control data that controls the air conditioner selected as an operation target apparatus.

In the configurations described in Japanese Patent Laid-Open No. 2015-095721 and Japanese Patent Laid-Open No. 2019-126096, control of an electrical apparatus and an air conditioner in a building is executed. However, there is a problem of not being able to cope with a case where a user only needs to know control contents of an operation state of the electrical apparatus. It is because it is not appropriate to make the user pay attention to a screen where the operation state of the electrical apparatus is displayed while the vehicle is traveling. Further, a purpose that the user determines the control contents while viewing the operation state of the electrical apparatus cannot be coped with either.

The present invention is implemented in consideration of such a background, and an object is to enable a user using a moving body to recognize an operation state of an electrical apparatus installed in a building in the moving body.

SUMMARY OF THE INVENTION

A first aspect for achieving the object described above is an information processing device including: a user action recognition part configured to recognize an action of a user of a moving body; an operation state acquisition part configured to acquire an operation state of an electrical apparatus installed in a building; and an information presentation part configured to display the operation state of the electrical apparatus at a display part installed in the moving body, and in a case where a specific action with which it is estimated that the user is to start traveling of the moving body is detected by the user action recognition part, the operation state of the electrical apparatus is acquired by the operation state acquisition part and the acquired operation state is displayed at the display part by the information presentation part.

In the information processing device, the information presentation part may line up and display operation states of a plurality of the electrical apparatuses for each electrical apparatus at the display part.

The information processing device may include: a communication part; an operation part presented by the information presentation part and configured to instruct changeover of the operation state of the electrical apparatus; a changeover instruction reception part configured to receive the instruction using the operation part; and an instruction transmission part configured to transmit the instruction to switch the operation state of the electrical apparatus by the communication part according to the instruction.

In the information processing device, the moving body may be provided with an openable/closable door and a door lock mechanism configured to lock the door at a closed position, and the user action recognition part may detect the specific action in the case of detecting unlocking of the door lock mechanism.

The information processing device may include a position information acquisition part configured to acquire a position of the moving body, and the information presentation part may display the operation state acquired by the user action recognition part at the display part in the case where the specific action is detected by the user action recognition part and the moving body is at a preset position.

In the information processing device, the communication part may include a short-range wireless communication part configured to execute short-range wireless communication, and switch and execute a first mode of being connected as a client to a short-range wireless communication network including the electrical apparatus and a second mode of making another device connectable to the short-range wireless communication part as a client, and the short-range wireless communication part may be switched from the second mode to the first mode in the case where the operation state acquisition part acquires the operation state of the electrical apparatus.

In the information processing device, in the case where the short-range wireless communication part is switched from the second mode to the first mode and the operation state acquisition part acquires the operation state of the electrical apparatus, the short-range wireless communication part may be switched from the first mode to the second mode after the operation state of the electrical apparatus is acquired.

In the information processing device, the communication part may be configured to be able to execute communication with a portable device used by the user, and the operation state acquisition part may make the communication with the portable device be executed by the communication part and acquire the operation state of the electrical apparatus in the case where unlocking of the door lock mechanism is detected by the user action recognition part.

A second aspect for achieving the object described above is an information processing method that recognizes an action of a user of a moving body, acquires an operation state of an electrical apparatus installed in a building in a case where a specific action with which it is estimated that the user is to start traveling of the moving body is detected, and displays the operation state of the electrical apparatus at a display part installed in the moving body.

A third aspect for achieving the object described above is a non-transitory computer-readable recording medium having a program executable by a computer that controls an information processing device recorded thereon, and the recording medium has the program for, by the computer, recognizing an action of a user of a moving body, acquiring an operation state of an electrical apparatus installed in a building in a case where a specific action with which it is estimated that the user is to start traveling of the moving body is detected, and displaying the operation state of the electrical apparatus at a display part installed in the moving body, recorded thereon.

According to the configuration described above, a user can efficiently use an electrical apparatus and convenience can be improved.

DETAILED DESCRIPTION OF THE PREFERRED EMBODIMENTS

1. First Embodiment

[1-1. Outline of Information Processing System]

Figure 1:
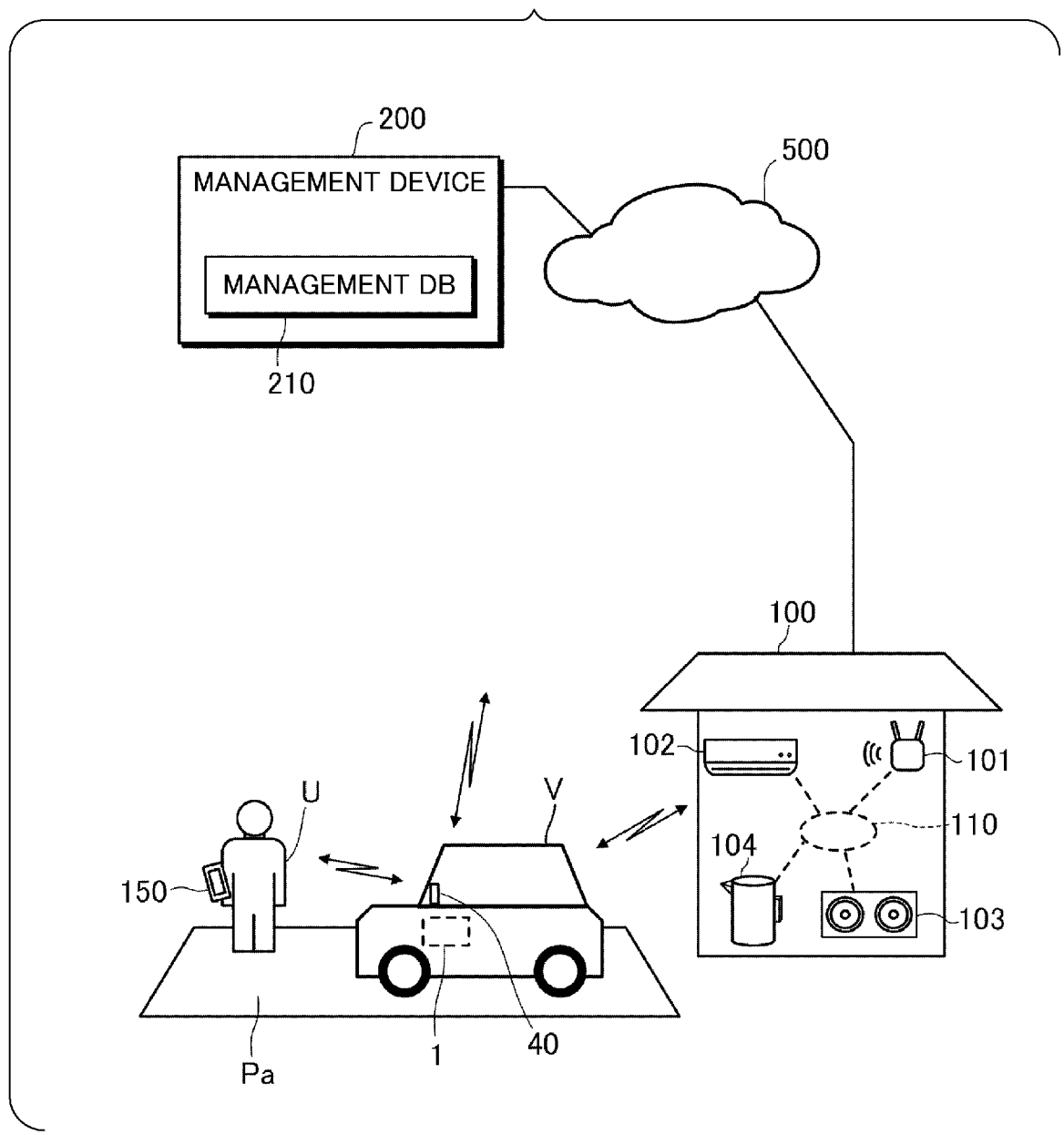
FIG. 1 is an explanatory drawing illustrating an outline of an information processing system.

FIG. 1 is an explanatory drawing illustrating the outline of the information processing system including an information processing device 1 of the first embodiment and a management device 200. In the present embodiment, as an example of a moving body, a vehicle V which is a four-wheel automobile is illustrated.

The vehicle V in FIG. 1 is a moving body used by a user U. A building 100 is a building managed by the user U. The building 100 is, for example, a house or a workplace of the user U. A target managed by the user U in the building 100 may be a part of the building 100. In the building 100, a plurality of electrical apparatuses 102, 103 and 104 are installed. As an example, the electrical apparatus 102 is an air conditioner, the electrical apparatus 103 is a smart speaker and the electrical apparatus 104 is an electric kettle. In the building 100, a wireless access point 101 is installed. The wireless access point 101 forms a wireless communication network 110 utilizing Wi-Fi®, for example. The electrical apparatuses 102, 103 and 104 installed in the building 100 are connected to the wireless communication network 110 as clients.

The wireless access point 101 is connected to a communication network 500 via a wire or wireless communication line. The communication network 500 is a data communication network, and the examples are a wide area communication network including a public network and a LAN (Local Area Network).

To the communication network 500, the management device 200 is connected. The management device 200 is a server device consisting of a computer, for example, and may be a cloud type server. The management device 200 executes data communication with the electrical apparatuses 102, 103 and 104 connected to the wireless access point 101 via the communication network 500. In addition, the management device 200 may execute the data communication with various kinds of devices including a portable device 150 to be described later via the communication network 500.

The electrical apparatuses 102, 103 and 104 execute the data communication with a device outside the building 100 through the wireless communication network 110. For example, the electrical apparatuses 102, 103 and 104 communicate with the management device 200 through the wireless communication network 110.

For example, the electrical apparatuses 102, 103 and 104 transmit information regarding an operation state to the management device 200 periodically or at a timing requested by the management device 200. The management device 200 includes a management DB 210 which stores the information received from the electrical apparatuses 102, 103 and 104.

Figure 2:
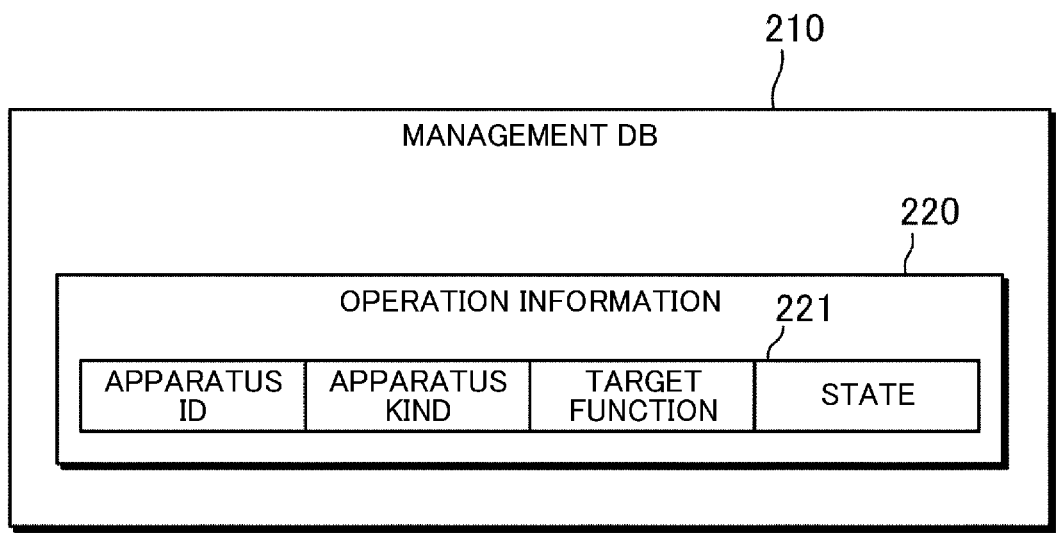
FIG. 2 is a schematic diagram of data stored by a management device.

FIG. 2 is a schematic diagram of data stored by the management device 200.

The management DB 210 illustrated in FIG. 2 stores operation information 220. The operation information 220 stores one record 221 for each electrical apparatus. In the example in FIG. 1, three records 221 corresponding to the respective electrical apparatuses 102, 103 and 104 are stored in the operation information 220.

The record 221 includes information indicating an apparatus ID, an apparatus kind, a target function and a state. The apparatus ID is the information identifying each of the electrical apparatuses 102, 103 and 104. The apparatus kind is the information indicating a kind of the electrical apparatus. The record 221 may include a name attached to the apparatus instead of the apparatus kind. The target function is the information indicating a function which is a target to record the operation state, among the functions that the electrical apparatus has. The state is the information indicating the operation state of the target function.

The record 221 is updated at a preset timing. For example, the record 221 is updated based on the information transmitted by the electrical apparatuses 102, 103 and 104 at every preset interval of time. In addition, the electrical apparatuses 102, 103 and 104 may transmit the information to the management device 200 every time the operation state changes. Every time the information is received from the electrical apparatuses 102, 103 and 104, the management device 200 updates the record 221 corresponding to the electrical apparatus which has transmitted the information.

Returning to FIG. 1, the wireless communication network 110 is not limited to the Wi-Fi as long as it is formed by a wireless communication technology that makes it possible to execute the data communication between the wireless access point 101 and the electrical apparatuses 102, 103 and 104. In addition, the wireless access point 101 may have a routing function, and a specific aspect of the wireless communication network 110 is arbitrarily changeable.

In the vehicle V, the information processing device 1 is loaded. The information processing device 1 may be a device fixedly installed in the vehicle V, or may be a device temporarily installed in the vehicle V. The information processing device 1 includes a touch panel 40 loaded in the vehicle V.

The information processing system displays the information regarding the operation states of the electrical apparatuses 102, 103 and 104 on the touch panel 40 loaded in the vehicle V, when the user U gets into the vehicle V. In FIG. 1, the vehicle V is stopped or parked at a parking location Pa near the building 100, and when the user U starts moving from the parking location Pa by the vehicle V, the information regarding the operation states of the electrical apparatuses 102, 103 and 104 is displayed on the touch panel 40.

In addition, on the touch panel 40, a setting part for remotely controlling the operation states of the electrical apparatuses 102, 103 and 104 is displayed. When the user U operates the touch panel 40 and performs input to the setting part, the functions of the electrical apparatuses 102, 103 and 104 are controlled corresponding to the input.

The device indicated with a sign 150 in the figure is a portable computer called a mobile device or a handheld computer, and is a smartphone or a tablet type computer for example. The portable device 150 of the present embodiment is the device used by the user U.

The information processing device 1 acquires the operation information of the electrical apparatuses 102, 103 and 104 by wireless communication. The operation information is the information indicating the operation states of the electrical apparatuses 102, 103 and 104. The information processing device 1 may acquire the operation information of all of the electrical apparatuses 102, 103 and 104, or may acquire the operation information of some electrical apparatuses. There are three aspects in which the information processing device 1 acquires the operation information.

A first aspect is the aspect in which the information processing device 1 is connected to the wireless access point 101 as a client and acquires the operation information from the electrical apparatuses 102, 103 and 104 via the wireless communication network 110. In this case, the information processing device 1 is connected to the wireless access point 101 by executing short-range wireless communication. In the first embodiment, the first aspect will be described.

A second aspect is the aspect in which the information processing device 1 executes the communication with the management device 200 via the communication network 500 and acquires the operation information from the management DB 210. In this case, the information processing device 1 is connected to the communication network 500 via the wireless communication line and acquires the record 221 stored in the management DB 210. In a second embodiment to be described later, the second aspect will be described.

In a third aspect, the information processing device 1 is connected to the portable device 150 by the short-range wireless communication. The portable device 150 has a short-range wireless communication function of communicating with the information processing device 1 and a communication function of being connected to the communication network 500. The information processing device 1 is connected to the communication network 500 by utilizing the communication function that the portable device 150 has, and acquires the record 221 stored in the management DB 210. In a third embodiment to be described later, the third aspect will be described.

[1-2. Configuration of Information Processing Device]

Figure 3:
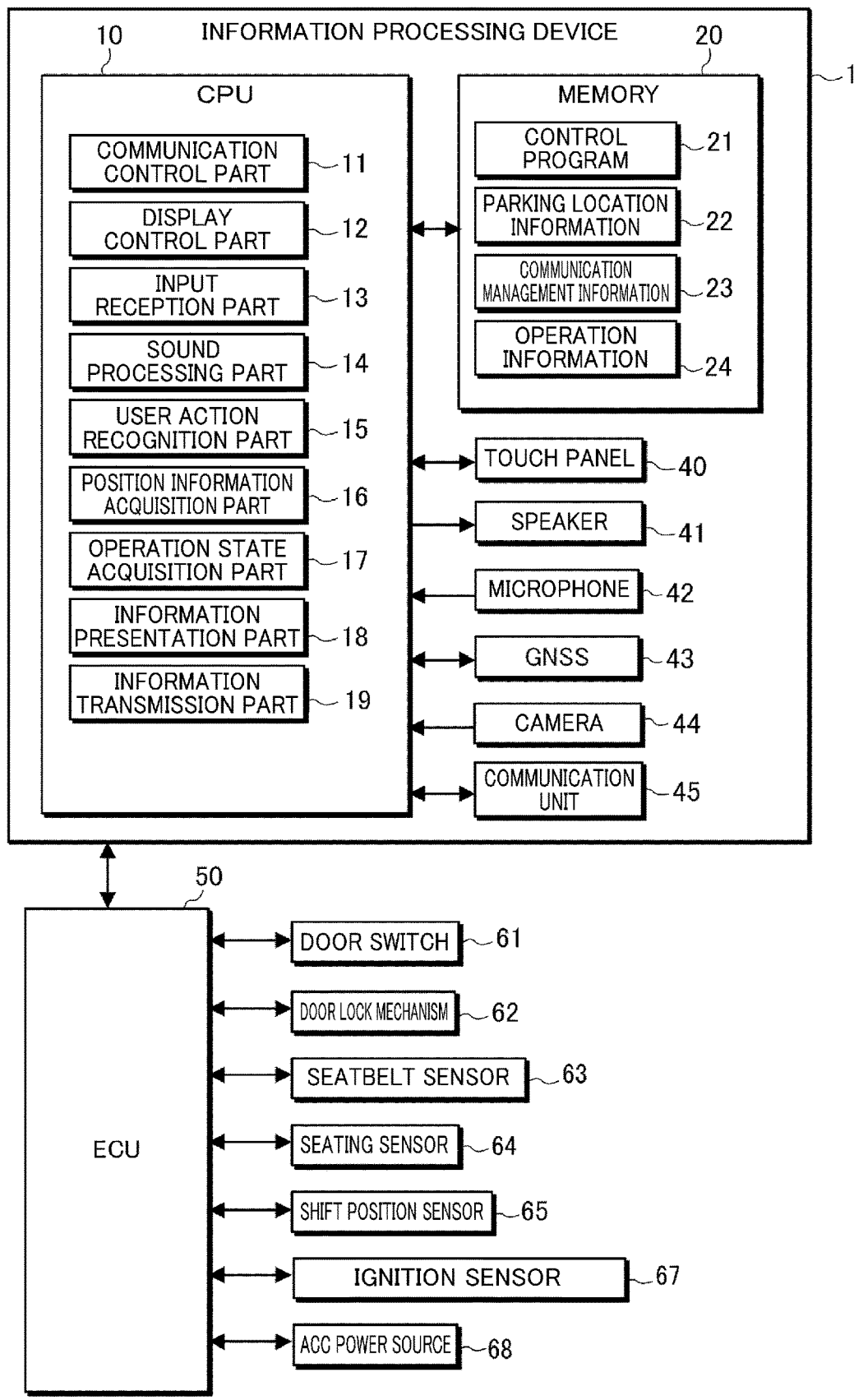
FIG. 3 is a block diagram of an information processing device of a first embodiment.

FIG. 3 is a block diagram of the information processing device 1 of the first embodiment.

The information processing device 1 includes a CPU (Central Processing Unit) 10 having a processor and a memory 20 which stores a program and data. The memory 20 is a storage device configured by a semiconductor memory device or a magnetic recording medium. The memory 20 stores a control program 21 to be executed by the CPU 10 and various kinds of data to be processed by the CPU 10. The CPU 10 controls respective parts of the information processing device 1 by executing the control program 21. The CPU 10 and the memory 20 may include a non-illustrated interface circuit. The memory 20 stores parking location information 22, communication management information 23 and operation information 24. The parking location information 22 is position information of a location registered as a location to park the vehicle V. Specifically, the parking location information 22 is the information indicating a position of the building 100 or an area within a predetermined distance from the building 100. For example, the parking location Pa to park the vehicle V while the user U is in the building 100 corresponds to the position indicated by the building 100. The communication management information 23 is the information for the building 100 to be connected to the wireless access point 101 by the function of a communication unit 45 (transceiver/receiver). The communication management information 23 includes, for example, a network name of the wireless communication network 110, a kind of a protocol used in the wireless communication network 110, and an ID and an access password for being connected to the wireless access point 101. The communication management information 23 may include presence/absence of the wireless access point 101 to which the communication unit 45 is connectable in the building 100 and a name of the wireless access point 101. The operation information 24 will be described later.

FIG. 3 illustrates a communication control part 11, a display control part 12, an input reception part 13, a sound processing part 14, a user action recognition part 15, a position information acquisition part 16, an operation state acquisition part 17, an information presentation part 18 and an information transmission part 19 as functional parts configured by the CPU 10. The individual functional parts are achieved by cooperation of software and hardware by the CPU 10 executing the control program 21. The functions of the individual parts will be described later.

To the CPU 10, the touch panel 40, a speaker 41, a microphone 42, a GNSS (Global Navigation Satellite System) 43, a camera 44 and the communication unit 45 are connected.

The touch panel 40, the speaker 41 and the microphone 42 are, for example, installed on a dashboard of the vehicle V. The touch panel 40 is configured such that a liquid crystal display panel which displays characters and images and a touch sensor which detects a touch on the liquid crystal display panel are superimposed. The touch panel 40 corresponds to an example of a display part.

The GNSS 43 has a receiver that receives GNSS signals and detects (measures) a current position of the vehicle V based on the GNSS signal. In the case where the vehicle V is loaded with a non-illustrated car navigation system, a GPS (Global Positioning System) unit or the like provided in the car navigation system may be utilized as the GNSS 43.

The camera 44 is a digital camera which photographs an interior space of the vehicle V. The camera 44 is installed at a front part in the interior of the vehicle V or on a ceiling in the interior of the vehicle V. The camera 44 may be an omnidirectional (360-degree) camera which photographs all directions or may be a wide angle camera. The camera 44 corresponds to an example of a photographing part.

The communication unit 45 includes a wireless communication device including an antenna, an RF circuit, an encoder and a decoder or the like. The communication unit 45 performs Wi-Fi and Bluetooth® communication. The communication unit 45 is connected with the wireless access point 101 by the Wi-Fi and executes the communication with the electrical apparatuses 102, 103 and 104 via the wireless communication network 110 which is a Wi-Fi network. The communication unit 45 corresponds to an example of a communication part and a short-range wireless communication part. In addition, the communication unit 45 may be able to execute the wireless communication by the Wi-Fi or Bluetooth with the information processing device 1.

The communication unit 45 is operated in two operation modes of an STA mode and an AP mode. The two operation modes are switched by control of the CPU 10. The STA mode is the operation mode in which the communication unit 45 is connected to another device as a client. The STA mode can be also referred to as a client mode. The STA mode corresponds to an example of a first mode. In the STA mode, the communication unit 45 is connected to the wireless access point 101 for example as a client. The AP mode is the operation mode in which the communication unit 45 functions as an access point and another apparatus is connected to the communication unit 45 as a client. The AP mode corresponds to an example of a second mode.

By operating the communication unit 45 in the AP mode, the information processing device 1 connects the portable device 150 to the information processing device 1 in the case where there is the portable device 150 inside the vehicle V, for example. In this case, the portable device 150 and the information processing device 1 execute the wireless communication, and a screen of an application program executed by the portable device 150 can be displayed on the touch panel 40. In addition, in the case where the user U performs an operation to the touch panel 40, the portable device 150 detects operation contents and the portable device 150 can execute processing according to the operation. In the AP mode, for example, the portable device 150 executes a navigation application which guides a route of an automobile, and displays the screen of the navigation application on the touch panel 40. Thus, even in the case where the information processing device 1 does not have a route guiding function, the user U can utilize a car navigation function.

The information processing device 1 is connected to an ECU (Electronic Control Unit) 50. The ECU 50 is a controller which controls electronic devices loaded in the vehicle V. The information processing device 1 is connected to the electronic devices loaded in the vehicle V via the ECU 50. FIG. 3 illustrates an example that the information processing device 1 is connected to a door switch 61, a door lock mechanism 62, a seatbelt sensor 63, a seating sensor 64, a shift position sensor 65, an ignition sensor 67 and an ACC power source 68 via the ECU 50. The vehicle V may be loaded with the plurality of ECUs 50. In this case, the plurality of ECUs 50 may be connected to the information processing device 1.

The door switch 61 is a switch type sensor which detects whether or not a door provided on the vehicle V is open. The door switch 61 may be provided only on the door used when a person who drives the vehicle V gets in and out. The door lock mechanism 62 locks the door provided on the vehicle V in a closed state. In the case where the vehicle V includes the plurality of doors, the plurality of door switches 61 and door lock mechanisms 62 may be provided corresponding to the respective doors.

The seatbelt sensor 63 detects a wearing state of a seatbelt provided on a seat of the vehicle V. The seating sensor 64 detects whether or not a person is seated on the seat of the vehicle V. The seatbelt sensor 63 and the seating sensor 64 may be provided on all the seats provided in the vehicle V or may be provided only on a driver's seat.

The shift position sensor 65 detects a shift position of a shift device provided in the vehicle V. The shift position is, for example, P (parking) used when parking the vehicle, R (reverse) used when moving backwards, N (neutral), and D (drive) used when traveling. The ignition sensor 67 detects a state of an ignition switch or a main switch of the vehicle V. The ACC power source (accessory power source) 68 is a power source supplied from a power source circuit provided in the vehicle V to the electronic device and accessories.

The communication control part 11 controls the communication unit 45 and performs the data communication. The communication control part 11 stores the data received by the communication unit 45 in the memory 20.

The display control part 12 outputs a control signal for display to the touch panel 40 and displays the screen including characters and images on the touch panel 40.

The input reception part 13 receives input by a person riding in the vehicle V by detecting the operation to the touch panel 40.

The sound processing part 14 acquires digital sound data of sound collected by the microphone 42. In addition, the sound processing part 14 drives the speaker 41 to output the sound.

The user action recognition part 15 recognizes an action of a recognition target person. The recognition target person is a person riding in the vehicle V or a person who is to get into the vehicle V, and is the user U for example. The user action recognition part 15 recognizes the action of the recognition target person, and detects that the person performs a preset specific action.

Here, the specific action includes the action with which it is estimated that the user U is to start moving by the vehicle V. The user action recognition part 15 detects the specific action in the case of detecting that (1) the user U gets into the vehicle V, (2) the user U starts the vehicle V and (3) the user U performs the operation for starting moving by the vehicle V, for example.

As a specific example, the user action recognition part 15 detects that the user U has gotten into the vehicle V in the case of detecting opening of the door of the vehicle V, unlocking of a door lock or seating in the driver's seat. The user action recognition part 15 detects that the user U has started the vehicle V in the case of detecting turning-on of the ignition switch or turning-on of the ACC power source 68. The user action recognition part 15 detects that the user U has performed the operation for starting moving in the case of detecting wearing of the seatbelt of the driver's seat or changeover of the shift position of the vehicle V from P to D or R. In addition, the user action recognition part 15 may detect that the user U has performed the operation for starting moving by the vehicle V in the case of detecting the operation of a steering wheel of the vehicle V, entry into a predetermined range of the vehicle V of the position information of a portable terminal owned by the user U or activation of an automatic driving function. Further, the user action recognition part 15 may detect that the user U has performed the operation for starting moving by the vehicle V in the case where a vehicle speed detected by a vehicle speed sensor of the vehicle V becomes greater than 0.

Opening of the door of the vehicle V and unlocking of the door lock indicate the operation that the user U performs first to move the vehicle V. Therefore, the user action recognition part 15 recognizes that the specific action is performed when detecting opening of the door of the vehicle V or unlocking of the door lock in the case where the vehicle V is stopped or parked and the user U is not present in the interior of the vehicle V, preferably.

The position information acquisition part 16 acquires the position of the vehicle V measured by the GNSS 43.

The operation state acquisition part 17 acquires the information indicating the operation states of the electrical apparatuses 102, 103 and 104. In the first embodiment, the operation state acquisition part 17 is connected to the wireless communication network 110 by the communication unit 45, executes the communication with each of the electrical apparatuses 102, 103 and 104 via the wireless communication network 110 and acquires the information indicating the operation states. The operation state acquisition part 17 generates the operation information 24 based on the acquired information and stores the operation information 24 in the memory 20.

The information presentation part 18 displays the operation states of the electrical apparatuses 102, 103 and 104 on the touch panel 40 based on the information acquired by the operation state acquisition part 17. For details, the operation states are listed and displayed on the screen of the touch panel 40 for each of the electrical apparatuses 102, 103 and 104.

The information presentation part 18 displays the screen including the setting part to be an operation target of the user U on the touch panel 40. The setting part is a user interface for the user U to instruct control of the function of the electrical apparatuses 102, 103 and 104. The information presentation part 18 lines up and displays the operation states of the electrical apparatuses 102, 103 and 104 and the setting part on the touch panel 40, for example.

The information transmission part 19 transmits the information to the electrical apparatuses 102, 103 and 104 by the communication unit 45. For details, in the case where the user U instructs the control of the function by utilizing the setting part presented by the information presentation part 18, the information transmission part 19 transmits control data which controls the function by the communication unit 45, to the electrical apparatus which is an instruction target. The control data is transmitted from the communication unit 45 via the wireless communication network 110 to the electrical apparatuses 102, 103 and 104.

[1-3. Operation of Information Processing Device]

Figure 4:
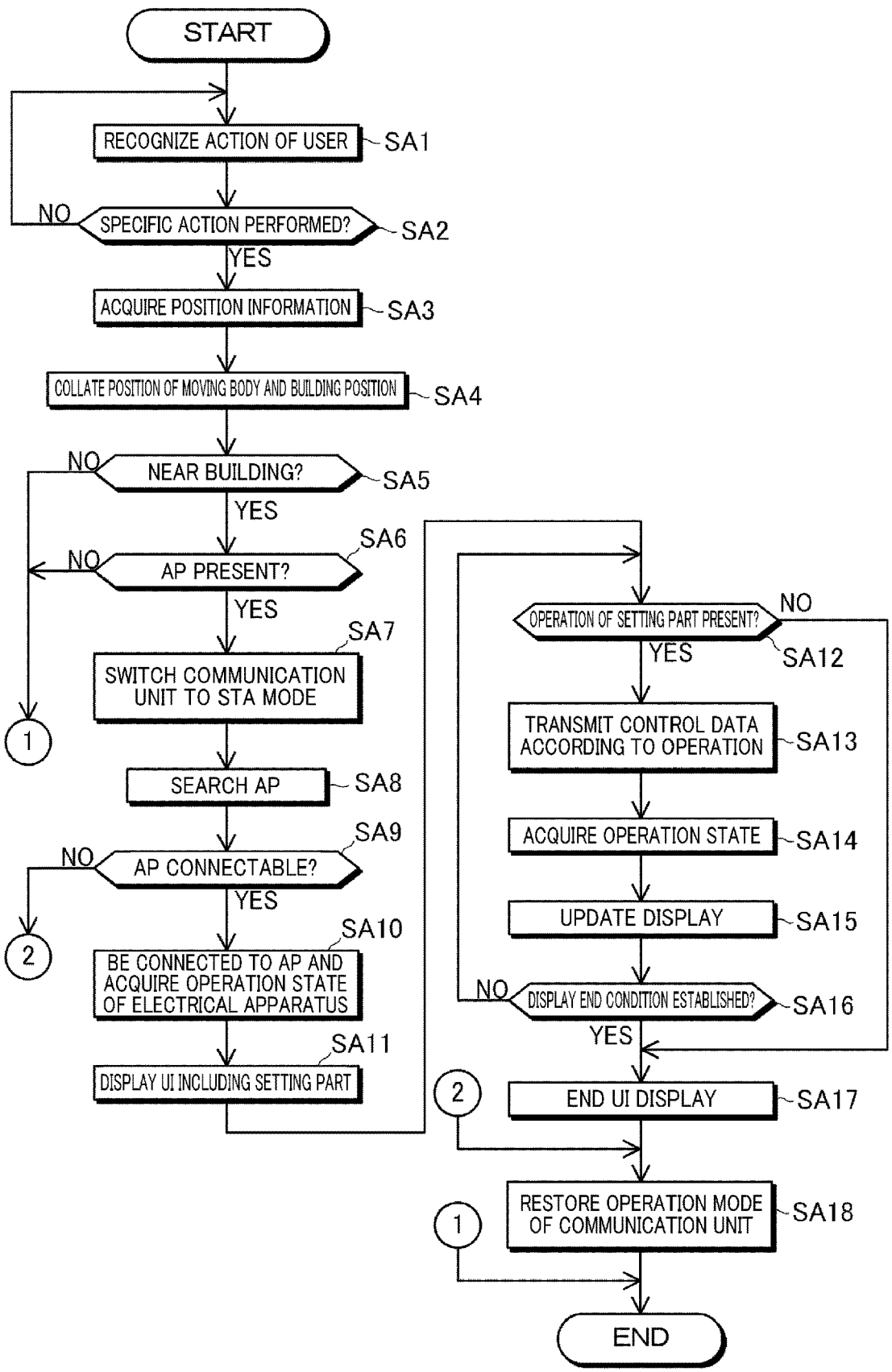
FIG. 4 is a flowchart illustrating an operation of the information processing device.
Figure 5:
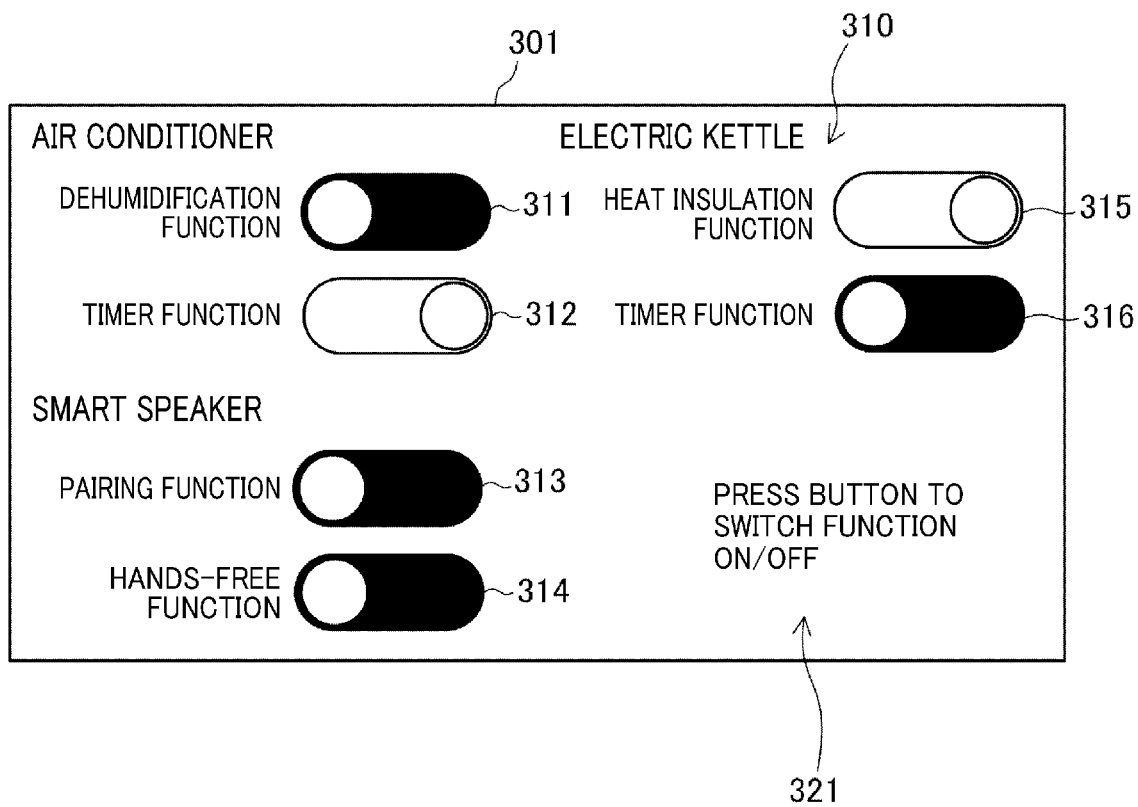
FIG. 5 is a diagram illustrating an example of a screen displayed by the information processing device.

FIG. 4 is a flowchart illustrating the operation of the information processing device 1. FIG. 5 is a diagram illustrating an example of the screen displayed by the information processing device 1.

Of the operation of the information processing device 1, steps SA1 and SA2 are executed by the user action recognition part 15 and steps SA3, SA4 and SA5 are executed by the position information acquisition part 16. Steps SA6-SA9 and SA18 are executed by the communication control part 11 and steps SA10 and SA14 are executed by the operation state acquisition part 17. Steps SA12 and SA13 are executed by the information transmission part 19.

The operation illustrated in FIG. 4 is executed in the state where the vehicle V is parked or stopped and the user U is not present inside the vehicle V.

The information processing device 1 recognizes the action of the user U by detecting the state of various kinds of switches of the vehicle V or the like (step SA1), and determines whether or not it corresponds to the specific action (step SA2).

In the case of determining that the action of the user U does not correspond to the specific action (step SA2; NO), the information processing device 1 returns to step SA1.

In the case of determining that the action of the user U corresponds to the specific action (step SA2; YES), the information processing device 1 acquires the position information of the vehicle V (step SA3). The information processing device 1 collates the position information of the vehicle V with the position of the building 100 (step SA4). In step SA4, the information processing device 1 collates the parking location information 22 with the position information acquired in step SA3.

The information processing device 1 determines whether or not the vehicle V is positioned near the building 100 (step SA5). Here, in the case of determining that the position of the vehicle V is not near the building 100 (step SA5; NO), the information processing device 1 ends the present processing.

In the case of determining that the position of the vehicle V is near the building 100 (step SA5; YES), the information processing device 1 refers to the communication management information 23 and determines whether or not there is the wireless access point 101 to which the communication unit 45 is connectable in the building 100 (step SA6). In the case of determining that there is no corresponding wireless access point 101 (step SA6; NO), the information processing device 1 ends the present processing. In the case of determining that there is the corresponding wireless access point 101 (step SA6; YES), the information processing device 1 sets the operation mode of the communication unit 45 to the STA mode (step SA7). A default operation of the communication unit 45 is often the AP mode. In this case, the information processing device 1 switches the operation mode of the communication unit 45 from the AP mode to the STA mode in step SA7.

The information processing device 1 searches the wireless access point 101 by the communication unit 45 (step SA8). The information processing device 1 determines whether or not it is possible to be connected to the wireless access point 101 (step SA9). In step SA9, for example, in the case of not being able to find the wireless access point 101 and in the case where it is not possible to be connected to the wireless access point 101, the information processing device 1 makes negative determination (step SA9; NO). In this case, the information processing device 1 shifts to step SA18 to be described later.

In the case where it is possible to be connected to the wireless access point 101 by the communication unit 45 (step SA9; YES), the information processing device 1 is connected to the wireless access point 101 and acquires the information indicating the operation states of the electrical apparatuses 102, 103 and 104 (step SA10). In step SA10, the information processing device 1 may execute the communication with the electrical apparatus 102, the communication with the electrical apparatus 103 and the communication with the electrical apparatus 104 in order and inquire the operation states. In addition, in the case where the wireless access point 101 has a function of managing the operation states of the electrical apparatuses 102, 103 and 104, the information processing device 1 may communicate with the wireless access point 101 and acquire the information indicating the operation states of the electrical apparatuses 102, 103 and 104. The information processing device 1 generates the operation information 24 based on the information acquired by the communication unit 45 and stores the operation information 24 in the memory 20.

The information processing device 1 generates the user interface (UI) including the setting part based on the operation information 24 and displays the user interface on the touch panel 40 (step SA11).

FIG. 5 is the diagram illustrating an apparatus operation screen 301 as an example of the screen displayed by the information processing device 1.

The apparatus operation screen 301 is the user interface which presents the information to the user U and receives the operation by the user U.

The apparatus operation screen 301 includes a setting part 310. At the setting part 310, apparatus operation buttons 311, 312, 313, 314, 315 and 316 are arranged. The apparatus operation buttons 311, 312, 313, 314, 315 and 316 indicate the operation states for the functions to be control targets, of the electrical apparatuses to be the control targets. Further, the apparatus operation buttons 311, 312, 313, 314, 315 and 316 function as operation parts which instruct changeover of ON and OFF of the functions to be the control targets. The user U performs the operation of touching the apparatus operation buttons 311, 312, 313, 314, 315 and 316 and the operation is detected by the touch sensor provided in the touch panel 40. At the respective apparatus operation buttons 311, 312, 313, 314, 315 and 316, the names of the functions to be the control targets are displayed.

On the apparatus operation screen 301, guide display 321 is displayed. The guide display 321 includes the characters and images which notify the user U of an operation method of the setting part 310.

For example, the apparatus operation buttons 311 and 312 correspond to the functions of the electrical apparatus 102. The electrical apparatus 102 is an air conditioner and the control target of the apparatus operation button 311 is a dehumidification function of the electrical apparatus 102. The control target of the apparatus operation button 312 is a timer function of the electrical apparatus 102. In the example in FIG. 5, as the operation state of the electrical apparatus 102, it is indicated that the dehumidification function is OFF by the apparatus operation button 311 and it is indicated that the timer function is ON by the apparatus operation button 312.

When a touch operation to the apparatus operation button 311 is received, the information processing device 1 performs the control of switching the ON and OFF of the dehumidification function of the electrical apparatus 102. That is, the user U can switch the ON and OFF of the dehumidification function of the electrical apparatus 102 by touching the apparatus operation button 311. Similarly, the user U can switch the ON and OFF of the individual functions of the electrical apparatuses 102, 103 and 104 displayed at the setting part 310 by operating the apparatus operation buttons 311, 312, 313, 314, 315 and 316.

The apparatus operation buttons 313 and 314 correspond to the functions of the electrical apparatus 103. The electrical apparatus 103 is a smart speaker and the control target of the apparatus operation button 313 is a pairing function of the electrical apparatus 103. The control target of the apparatus operation button 314 is a hands-free communication function of the electrical apparatus 103. In the example in FIG. 5, as the operation state of the electrical apparatus 103, it is indicated that the pairing function and the hands-free communication function are OFF.

The apparatus operation buttons 315 and 316 correspond to the functions of the electrical apparatus 104. The electrical apparatus 104 is an electric kettle and the control target of the apparatus operation button 315 is a heat insulation function of the electrical apparatus 103. The control target of the apparatus operation button 316 is a timer function of the electrical apparatus 104. In the example in FIG. 5, as the operation state of the electrical apparatus 104, it is indicated that the heat insulation function is ON by the apparatus operation button 315 and it is indicated that the timer function is OFF by the apparatus operation button 316.

The information processing device 1 displays the apparatus operation screen 301 with detection of the specific action as a trigger. Since the apparatus operation screen 301 is displayed on the touch panel 40 when getting into the vehicle V, the user U can look at the apparatus operation screen 301 and recognize the operation states of the electrical apparatuses of the building 100. For example, the apparatus operation screen 301 in FIG. 5 notifies the user U of the fact that the heat insulation function of the electric kettle is ON. The user U can switch the heat insulation function of the electric kettle to be OFF by operating the apparatus operation button 315. In such a manner, the user U can recognize the operation states of the electrical apparatuses 102, 103 and 104 and control the operation states of the electrical apparatuses 102, 103 and 104 before starting moving by the vehicle V. For example, in the case where the user U forgets to turn off the electrical apparatus or forgets to operate the timer function and gets into the vehicle V, the operations can be performed inside the vehicle V.

Returning to FIG. 4, the information processing device 1 determines presence/absence of the operation to the setting part displayed in step SA11 (step SA12). In the case where the operation is not performed within a predetermined period of time (step SA12; NO), the information processing device 1 shifts to step SA17 to be described later.

In the case where the operation to the setting part is performed (step SA12; YES), the information processing device 1 transmits the control data to the electrical apparatuses 102, 103 and 104 by the communication unit 45 according to the operation (step SA13). In step SA13, the information processing device 1 transmits the control data which controls the function corresponding to the operation to the electrical apparatus corresponding to the operation of the user U to the setting part among the electrical apparatuses 102, 103 and 104.

The information processing device 1 acquires the information indicating the operation states of the electrical apparatuses 102, 103 and 104 (step SA14) and updates display of the user interface based on the acquired information (step SA15).

The information processing device 1 determines whether or not a display end condition to end the display of the user interface is established (step SA16). The examples of the display end condition are continuation of the state without the operation to the touch panel 40 for the predetermined period of time or longer, the changeover of the ignition switch of the vehicle V from OFF to ON, the changeover of the shift position of the vehicle V to D and the change of the vehicle speed of the vehicle V from 0 to a value larger than 0.

In the case where the display end condition is not established (step SA16; NO), the information processing device 1 returns to step SA12. In the case where the display end condition is established (step SA16; YES), the information processing device 1 ends the display of the user interface (step SA17). The information processing device 1 restores the operation mode of the communication unit 45 to the state before being switched in step SA7 (step SA18) and ends the present processing.

2. Second Embodiment

Figure 6:
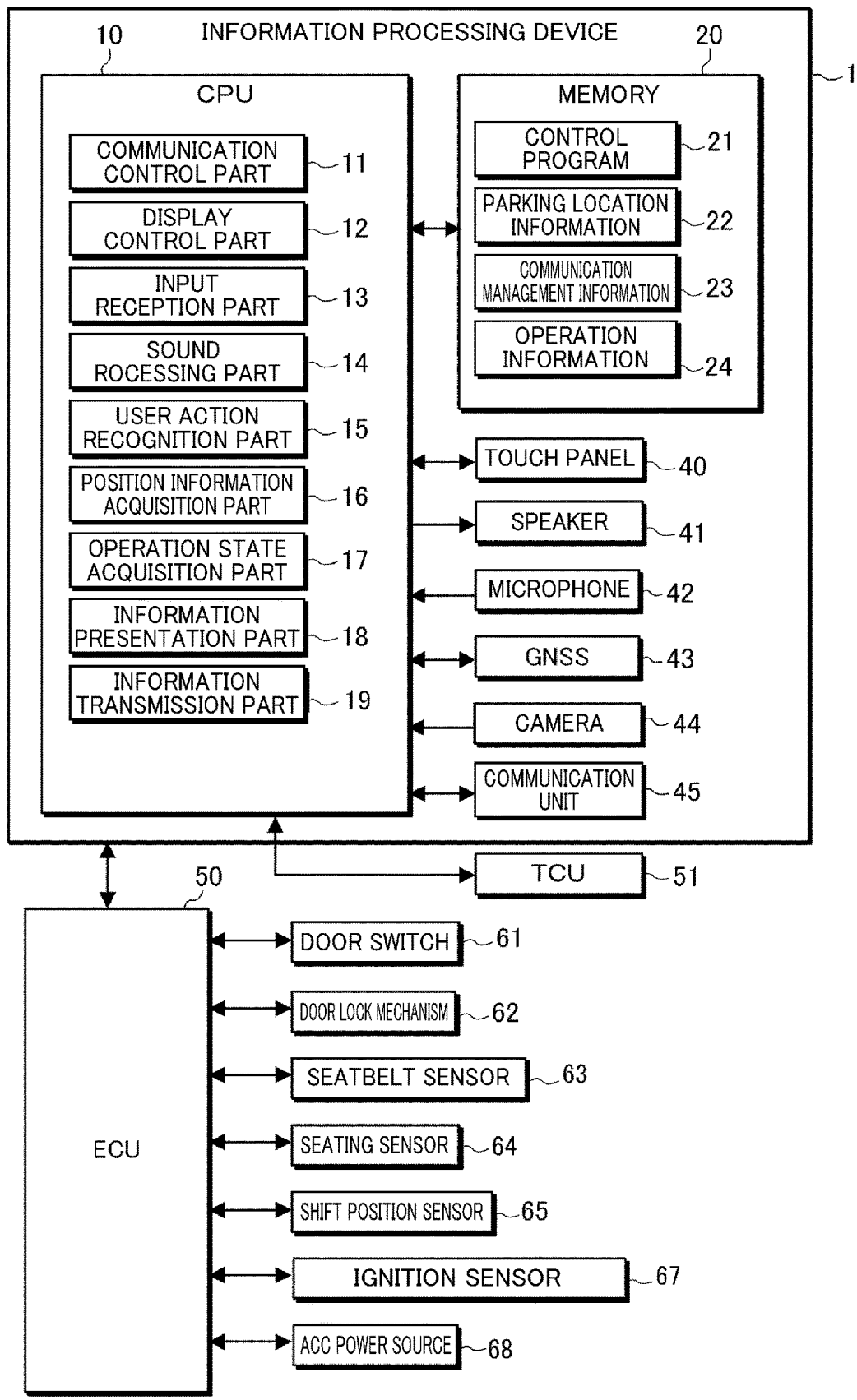
FIG. 6 is a block diagram of the information processing device of a second embodiment.

FIG. 6 is a block diagram of the information processing device 1 of the second embodiment. In the second embodiment, the information processing device 1 is loaded in the vehicle V including a TCU 51 and the information processing device 1 is connected to the TCU 51. Except for the TCU 51, the configuration illustrated in FIG. 6 and the configuration of the information processing system including the information processing device 1 are in common with the first embodiment. Same signs are attached to components in common with the first embodiment and illustrations and description are omitted.

The TCU (Telematic Control Unit) 51 includes a wireless communication device including an antenna, an RF circuit, an encoder and a decoder or the like. The wireless communication device that the TCU 51 includes is a communication module based on a 3G, 3.9G, 4G or 5G mobile communication standard established by 3GPP (Third Generation Partnership Project), and executes mobile data communication. The TCU 51 is connected to the communication network 500 by a mobile communication line and executes the data communication with the management device 200.

The information processing device 1 controls the TCU 51 and executes the data communication utilizing the TCU 51 by the function of the communication control part 11. In this case, the communication management information 23 includes the information for controlling the TCU 51 and access information for being connected to the management device 200 by the TCU 51. For example, the communication management information 23 includes a network address of the management device 200 and a user ID and a password or the like for accessing the management device 200.

Figure 7:
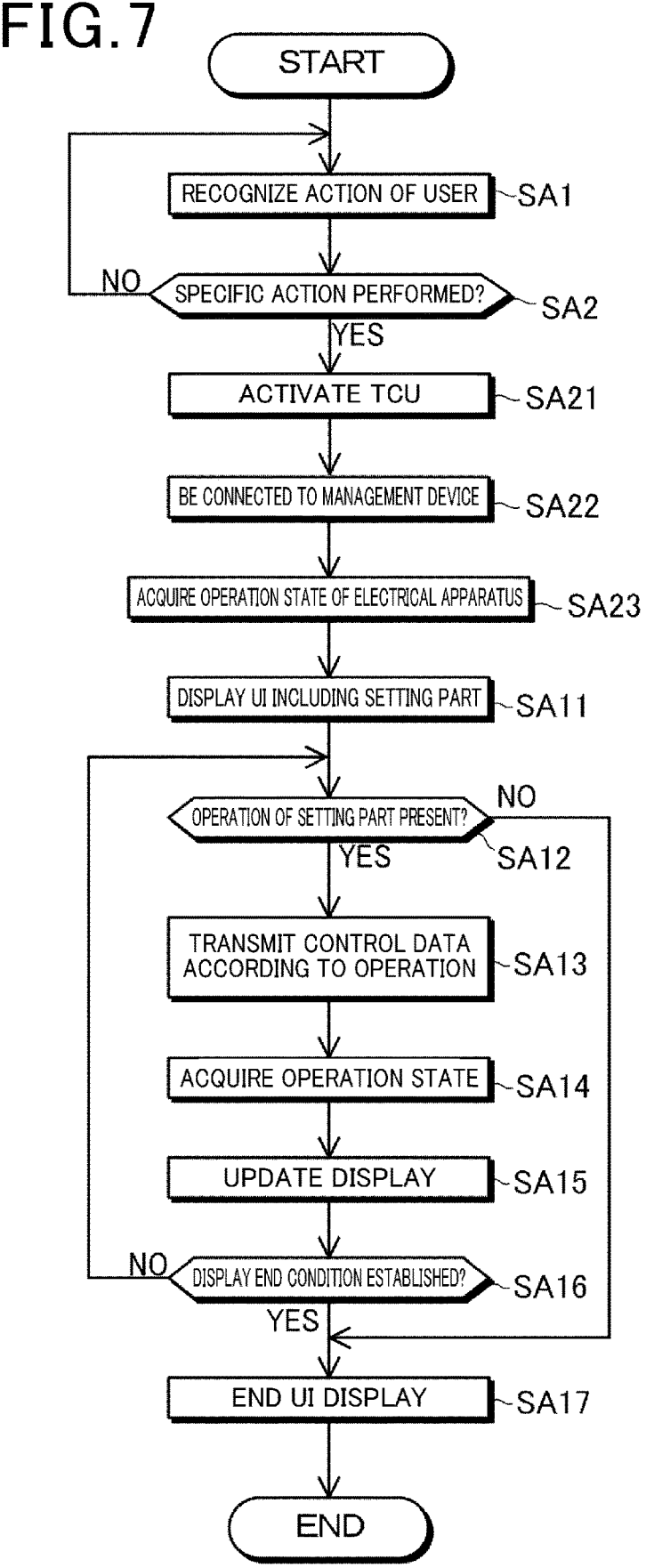
FIG. 7 is a flowchart illustrating the operation of the information processing device of the second embodiment.

FIG. 7 is a flowchart illustrating the operation of the information processing device 1 of the second embodiment. In the flowchart in FIG. 7, same step numbers are attached to the operation steps in common with FIG. 4 and the description is omitted.

After step SA2, the information processing device 1 activates the TCU 51 to start the communication utilizing the TCU 51 (step SA21) and is connected to the management device 200 (step SA22). The information processing device 1 acquires the record 221 of the operation information 220 stored in the management DB 210 and stores the record 221 in the memory 20 as the operation information 24 (step SA23). Thereafter, the information processing device 1 generates the user interface including the setting part based on the operation information 24 and displays the user interface on the touch panel 40 (step SA11). The operation after step SA11 is similar to that in FIG. 4.

In the second embodiment, the information processing device 1 accesses the management device 200 by utilizing the TCU 51 provided in the vehicle V. Therefore, the information processing device 1 can be combined and used with the configuration that the electrical apparatuses 102, 103 and 104 do not have the function of executing direct communication with the information processing device 1 and the configuration that the management device 200 manages the operation states of the electrical apparatuses 102, 103 and 104. For example, in the case where the user U has a contract of a cloud service which manages the operation states of the electrical apparatuses 102, 103 and 104 by the management device 200, the information processing device 1 can be operated by utilizing the cloud service.

3. Third Embodiment

Figure 8:
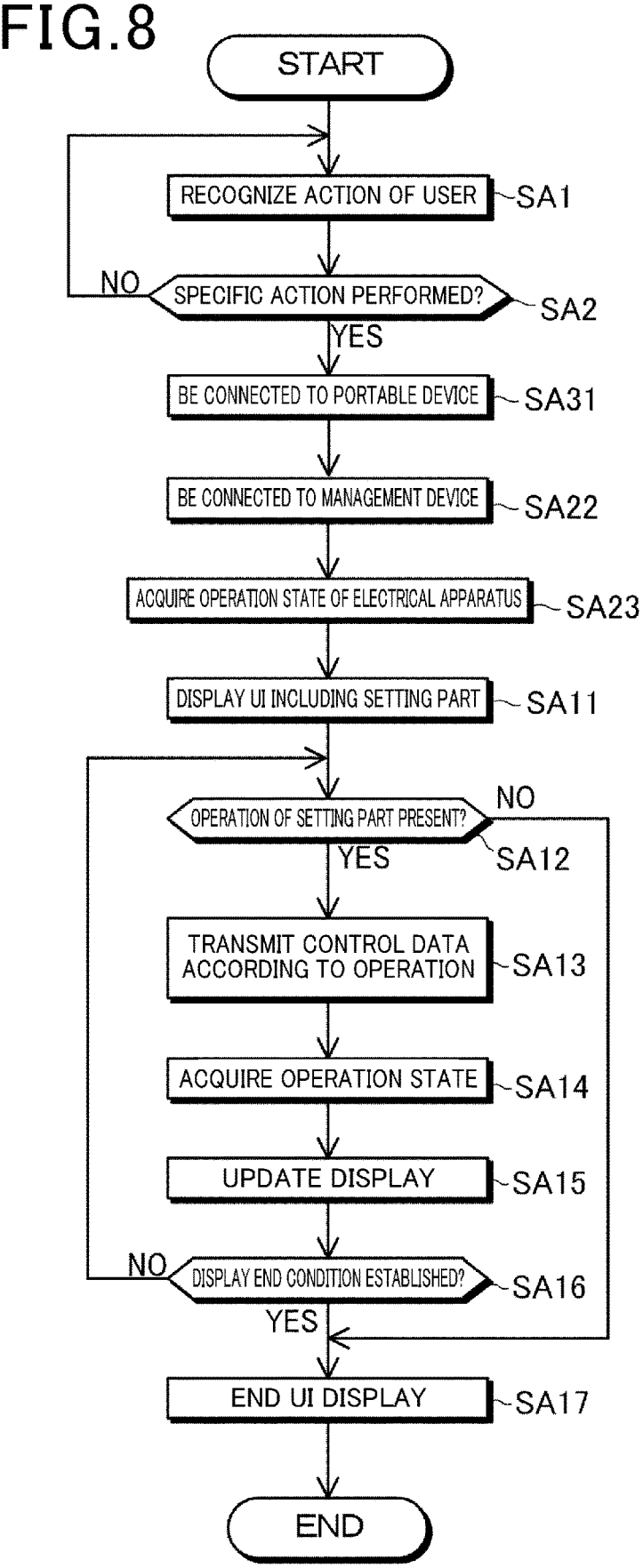
FIG. 8 is a flowchart illustrating the operation of the information processing device of a third embodiment.

FIG. 8 is a flowchart illustrating the operation of the information processing device 1 of the third embodiment. In the third embodiment, a different operation example of the information processing device 1 is illustrated. The configuration of the information processing device 1 and the information processing system of the third embodiment is either one of the configuration described in the first embodiment and the configuration described in the second embodiment. For the configuration of the information processing device 1 and the information processing system, the illustrations and the description are omitted in the third embodiment. In addition, in the flowchart in FIG. 8, the same step numbers are attached to the operations steps in common with FIG. 4 and the description is omitted.

In the third embodiment, the information processing device 1 executes the communication with the portable device 150 by the communication unit 45. For example, the communication unit 45 executes Wi-Fi Direct or Bluetooth communication with the portable device 150 according to the control of the communication control part 11. A connection form of the information processing device 1 and the portable device 150 corresponds to so-called tethering. The information processing device 1 executes the communication with the management device 200 by being connected to the communication network 500 by utilizing a mobile communication function that the portable device 150 has.

In this case, the communication management information 23 includes the information for being connected to the portable device 150 and the access information for being connected to the management device 200 by tethering. For example, the communication management information 23 includes an ID and a password for being connected to the portable device 150. In addition, the communication management information 23 includes the network address of the management device 200 and a user ID and a password or the like for accessing the management device 200.

After step SA2, the information processing device 1 is connected to the portable device 150 by the communication unit 45 (step SA31). Subsequently, the information processing device 1 is connected to the management device 200 similarly to the operation described in the second embodiment (step SA22). The information processing device 1 acquires the record 221 of the operation information 220 stored in the management DB 210 and stores the record 221 in the memory 20 as the operation information 24 (step SA23). Thereafter, the information processing device 1 generates the user interface including the setting part based on the operation information 24 and displays the user interface on the touch panel 40 (step SA11). The operation after step SA11 is similar to that in FIG. 4.

4. Other Embodiments

The embodiments described above illustrate specific examples to which the present invention is applied and do not limit the form to which the invention is applied.

For example, while the above-described embodiments have illustrated the configuration that the operation states of the electrical apparatuses 102, 103 and 104 specify whether or not the functions of the electrical apparatuses 102, 103 and 104 are ON or OFF, the operation states may be more detailed functions. For example, in the case where the electrical apparatus is an air conditioner, a set temperature of the air conditioner and set time of a timer may be acquired as the operation states. In addition, for example, the configuration may be such that the set temperature of the air conditioner and the set time of the timer can be set and changed by utilizing the user interface including the setting part.

Further, for example, while the above-described embodiments have illustrated a four-wheel automobile as an example of the vehicle V, the vehicle V can be various vehicles such as a two-wheel vehicle and a freight vehicle.

In addition, in the above-described embodiments, the information processing device 1 has been described as the one that displays the user interface including the setting part on the touch panel 40 and receives the touch operation to the touch panel 40. This is an example, and the information processing device 1 may display the user interface on the touch panel 40 and then receive the operation by sound by utilizing the microphone 42 for example. Further, the configuration may be such that the operation states of the electrical apparatuses are presented by outputting the sound by the speaker 41.

In addition, the communication unit 45 is not limited to the configuration of executing the Wi-Fi communication or the Bluetooth communication, and may execute the communication based on other short-range wireless communication standards. For example, NFC (Near Field Communication) or the communication of Zigbee® may be performed.

Further, the electrical apparatuses 102, 103 and 104 which are the targets of operation state acquisition by the information processing device 1 are not limited to the configuration of performing the Wi-Fi communication with the wireless access point 101. For example, the configuration may be such that an apparatus management device which manages the electrical apparatuses 102, 103 and 104 is installed in the building 100 instead of the wireless access point 101 and the apparatus management device and the electrical apparatuses 102, 103 and 104 perform the communication by the Bluetooth or the Zigbee. In this case, the information processing device 1 may acquire the information indicating the operation states of the electrical apparatuses 102, 103 and 104 by executing the communication with the apparatus management device by the communication unit 45.

In addition, the information processing device 1 is not limited to the one fixedly installed in the vehicle V. That is, when the touch panel 40 which is a device to present the user interface is installed in the vehicle V, the other configuration can be arbitrarily changed. For example, part of the operation executed by the CPU 10 of the information processing device 1 described in the above-described embodiments may be achieved by a device similar to the portable device 150.

Note that FIG. 3 is a schematic diagram in which the functional configuration of the information processing device 1 is sectioned by main processing contents and illustrated in order to facilitate understanding of the present claimed invention, and does not limit the configuration of the information processing device 1. For example, the processing of the components provided in the CPU 10 may be executed by one hardware unit, or may be executed by a plurality of hardware units.

In addition, the individual processing illustrated in FIG. 4, FIG. 7 and FIG. 8 may be executed by one program, or may be executed by a plurality of programs.

Further, the control program 21 executed by the CPU 10 can be achieved in the state of recording the control program 21 in a portable information recording medium. The examples of the information recording medium are a magnetic recording medium such as a hard disk, an optical recording medium such as a CD and a semiconductor storage device such as an USB (Universal Serial Bus) memory and an SSD (Solid State Drive), and the other recording media can be also used. The information processing device 1 may read the control program 21 from the information recording medium and execute the control program 21.

5. Configuration Supported by Above-Described Embodiments

The above-described embodiments are specific examples of the configuration below.

(Item 1) An information processing device including: a user action recognition part configured to recognize an action of a user of a moving body; an operation state acquisition part configured to acquire an operation state of an electrical apparatus installed in a building; and an information presentation part configured to display the operation state of the electrical apparatus at a display part installed in the moving body, wherein, in a case where a specific action with which it is estimated that the user is to start traveling of the moving body is detected by the user action recognition part, the operation state of the electrical apparatus is acquired by the operation state acquisition part and the acquired operation state is displayed at the display part by the information presentation part.

According to the information processing device of Item 1, the operation state of the electrical apparatus installed in the building is displayed when the user starts traveling of the moving body. Therefore, the user can be notified of the operation state of the electrical apparatus before the user moves far. Thus, the user can efficiently use the electrical apparatus and convenience can be improved.

(Item 2) The information processing device according to Item 1, wherein the information presentation part lines up and displays operation states of a plurality of the electrical apparatuses for each electrical apparatus at the display part.

According to the information processing device of Item 2, operation states of a plurality of the electrical apparatuses can be displayed so as to be easy to see for the user.

(Item 3) The information processing device according to Item 1 or Item 2, including: a communication part; an operation part presented by the information presentation part and configured to instruct changeover of the operation state of the electrical apparatus; a changeover instruction reception part configured to receive the instruction using the operation part; and an instruction transmission part configured to transmit the instruction to switch the operation state of the electrical apparatus by the communication part according to the instruction.

According to the information processing device of Item 3, the user can switch the operation state of the electrical apparatus in the building.

(Item 4) The information processing device according to Item 3, wherein the moving body is provided with an openable/closable door and a door lock mechanism configured to lock the door at a closed position, and the user action recognition part detects the specific action in the case of detecting unlocking of the door lock mechanism.

According to the information processing device of Item 4, the user can be notified of the operation state of the electrical apparatus installed in the building before the user moves the moving body.

(Item 5) The information processing device according to Item 3 or Item 4, including a position information acquisition part configured to acquire a position of the moving body, wherein the information presentation part displays the operation state acquired by the user action recognition part at the display part in the case where the specific action is detected by the user action recognition part and the moving body is at a preset position.

According to the information processing device of Item 5, the user can be notified of the operation state of the electrical apparatus corresponding to the position of the vehicle used by the user. Therefore, the user can be notified of the operation state of the electrical apparatus in the case where usefulness of notifying the operation state of the electrical apparatus in the building is high such as at a location near the building, and notices unnecessary for the user can be reduced.

(Item 6) The information processing device according to any one of Item 3 to Item 5, wherein the communication part includes a short-range wireless communication part configured to execute short-range wireless communication, and switches and executes a first mode of being connected as a client to a short-range wireless communication network including the electrical apparatus and a second mode of making another device connectable to the short-range wireless communication part as a client, and the short-range wireless communication part is switched from the second mode to the first mode in the case where the operation state acquisition part acquires the operation state of the electrical apparatus.

According to the information processing device of Item 6, the operation state of the electrical apparatus can be acquired by utilizing the short-range wireless communication part capable of connecting another device as a client. Therefore, a device which executes the short-range wireless communication with another device can be utilized as the information processing device which processes the operation state of the electrical apparatus.

(Item 7) The information processing device according to Item 6, wherein, in the case where the short-range wireless communication part is switched from the second mode to the first mode and the operation state acquisition part acquires the operation state of the electrical apparatus, the short-range wireless communication part is switched from the first mode to the second mode after the operation state of the electrical apparatus is acquired.

According to the information processing device of Item 7, another device can be connected as a client by switching the operation mode of the short-range wireless communication part after the operation state of the electrical apparatus is acquired.

(Item 8) The information processing device according to Item 4, wherein the communication part is configured to be able to execute communication with a portable device used by the user, and the operation state acquisition part makes the communication with the portable device be executed by the communication part and acquires the operation state of the electrical apparatus in the case where unlocking of the door lock mechanism is detected by the user action recognition part.

According to the information processing device of Item 8, by communicating with the portable device, the operation state of the electrical apparatus can be acquired. In addition, since the operation state of the electrical apparatus is acquired and displayed in the case of detecting unlocking of the door lock mechanism, the user can be notified of the operation state of the electrical apparatus installed in the building before the user moves the moving body.

(Item 9) An information processing method that recognizes an action of a user of a moving body, acquires an operation state of an electrical apparatus installed in a building in a case where a specific action with which it is estimated that the user is to start traveling of the moving body is detected, and displays the operation state of the electrical apparatus at a display part installed in the moving body.

According to the information processing method of Item 9, the operation state of the electrical apparatus installed in the building is displayed when the user starts traveling of the moving body. Therefore, the user can be notified of the operation state of the electrical apparatus before the user moves far. Thus, the user can efficiently use the electrical apparatus and convenience can be improved.

(Item 10) A non-transitory computer-readable recording medium having a program executable by a computer that controls an information processing device recorded thereon, the recording medium having the program for, by the computer, recognizing an action of a user of a moving body, acquiring an operation state of an electrical apparatus installed in a building in a case where a specific action with which it is estimated that the user is to start traveling of the moving body is detected, and displaying the operation state of the electrical apparatus at a display part installed in the moving body, recorded thereon.

According to the program of Item 10, the operation state of the electrical apparatus installed in the building is displayed when the user starts traveling of the moving body. Therefore, the user can be notified of the operation state of the electrical apparatus before the user moves far. Thus, the user can efficiently use the electrical apparatus and convenience can be improved.

1 . . . information processing device, 10 . . . CPU, 11 . . . communication control part, 13 . . . input reception part, 14 . . . sound processing part, 15 . . . user action recognition part, 16 . . . position information acquisition part, 17 . . . operation state acquisition part, 18 . . . information presentation part, 19 . . . information transmission part, 20 . . . memory, 21 . . . control program (program), 22 . . . parking location information, 23 . . . communication management information, 24 . . . operation information, 40 . . . touch panel (display part), 41 . . . speaker, 42 . . . microphone, 43 . . . GNSS, 44 . . . camera (photographing part), 45 . . . communication unit (communication part), 100 . . . building, 101 . . . wireless access point, 102, 103, 104 . . . electrical apparatus, 110 . . . wireless communication network, 150 . . . portable device, 200 . . . management device, 301 . . . apparatus operation screen, 310 . . . setting part, 500 . . . communication network, Pa . . . parking location, U . . . user, V . . . vehicle (moving body).

What is claimed is:

1. An information processing device comprising a processor; and
   a communication part which includes a transceiver and a receiver,
   the information processing device being connected to an electronic control unit (ECU) that is loaded in a moving body, wherein the processor is configured to:
detect a specific action with which it is estimated that a user of the moving body is to start traveling of the moving body based on data received from the ECU;
acquire an operation state of an electrical apparatus installed in a building; and
display the operation state of the electrical apparatus at a display installed in the moving body,
wherein, the specific action is any one of
(1) the user gets into the moving body,
(2) the user starts the moving body, and
(3) the user performs an operation for starting moving by the moving body,
in a case where the specific action is detected by the processor, the operation state of the electrical apparatus is acquired by the processor from the electrical apparatus via a wireless communication network and the acquired operation state is displayed at the display by the processor,
the information processing device further comprises an apparatus operation button for instructing changeover of the operation state of the electrical apparatus,
the processor:
receives instruction using the apparatus operation button; and
transmits the instruction to switch the operation state of the electrical apparatus according to the instruction.

2. The information processing device according to claim 1, wherein the processor lines up and displays operation states of a plurality of the electrical apparatuses for each electrical apparatus at the display.

3. The information processing device according to claim 1,
wherein the moving body is provided with an openable and closable door and a door lock mechanism configured to lock the door at a closed position, and
the processor detects the specific action in the case of detecting unlocking of the door lock mechanism.

4. The information processing device according to claim 3,
wherein the communication part is configured to be able to execute communication with a portable device used by the user, and
the processor makes the communication with the portable device be executed by the communication part and acquires the operation state of the electrical apparatus in the case where unlocking of the door lock mechanism is detected by the processor.

5. The information processing device according to claim 1, wherein
the processor acquires a position of the moving body, and
the processor displays the operation state acquired at the display in the case where the specific action is detected and the moving body is at a preset position.

6. The information processing device according to claim 1,
wherein the communication part executes short-range wireless communication, and switches and executes a first mode of being connected as a client to a short-range wireless communication network including the electrical apparatus and a second mode of making another device connectable to the short-range wireless communication as a client, and
the short-range wireless communication is switched from the second mode to the first mode in the case where the processor acquires the operation state of the electrical apparatus.

7. The information processing device according to claim 6, wherein, in the case where the short-range wireless communication is switched from the second mode to the first mode and the processor acquires the operation state of the electrical apparatus, the short-range wireless communication is switched from the first mode to the second mode after the operation state of the electrical apparatus is acquired.

8. An information processing method that
detects a specific action with which it is estimated that a user of a moving body is to start traveling of the moving body based on data received from an electronic control unit (ECU) that is loaded in the moving body,
acquires an operation state of an electrical apparatus installed in a building, from the electrical apparatus via a wireless communication network in a case where the specific action is detected, and
displays the operation state of the electrical apparatus at a display installed in the moving body, wherein
the specific action is any one of
(1) the user gets into the moving body,
(2) the user starts the moving body, and
(3) the user performs an operation for starting moving by the moving body,
the method comprises:
receiving instruction using an apparatus operation button for instructing changeover of the operation state of the electrical apparatus; and
transmitting the instruction to switch the operation state of the electrical apparatus according to the instruction.

9. A non-transitory computer-readable recording medium having a program executable by a computer that controls an information processing device recorded thereon, the recording medium having the program for
by the computer,
detecting a specific action with which it is estimated that a user of the moving body is to start traveling of a moving body based on data received from an electronic control unit (ECU) that is loaded in the moving body,
acquiring an operation state of an electrical apparatus installed in a building, from the electrical apparatus via a wireless communication network in a case where the specific action detected, and
displaying the operation state of the electrical apparatus at a display installed in the moving body, recorded thereon, wherein
the specific action is any one of
(1) the user gets into the moving body,
(2) the user starts the moving body, and
(3) the user performs an operation for starting moving by the moving body,
the program comprises:
receiving instruction using an apparatus operation button for instructing changeover of the operation state of the electrical apparatus; and
transmitting the instruction to switch the operation state of the electrical apparatus according to the instruction.

* * * * *